May 9, 1933.  D. GERBER  1,907,955
CYLINDER AND PIPE CUTTING MACHINE
Filed May 15, 1931  3 Sheets-Sheet 1

INVENTOR.
DWIGHT GERBER.
BY
ATTORNEY.

May 9, 1933.　　　　D. GERBER　　　　1,907,955
CYLINDER AND PIPE CUTTING MACHINE
Filed May 15, 1931　　　3 Sheets-Sheet 3
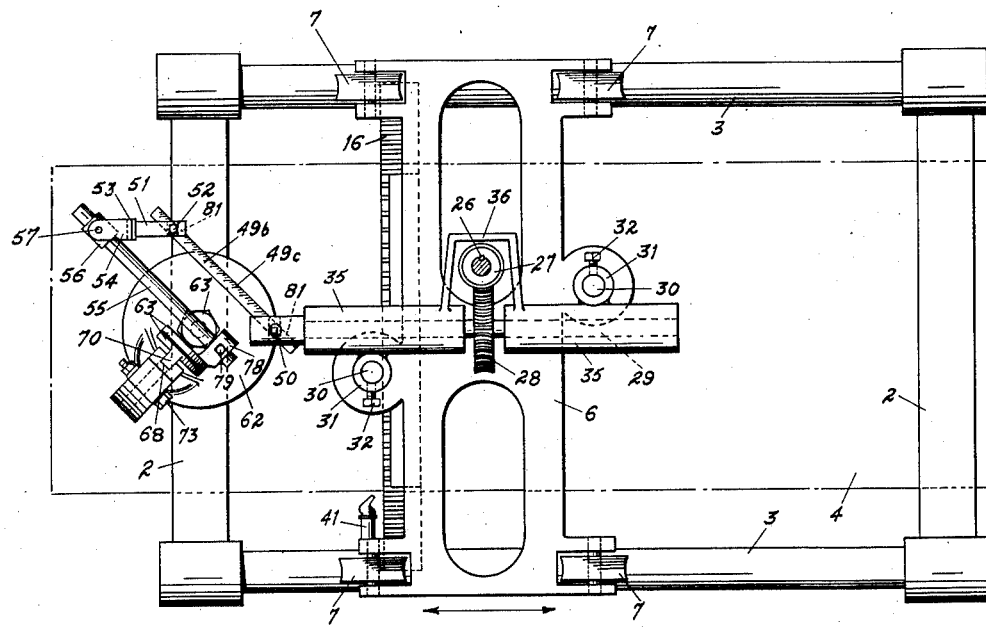
Fig.3.
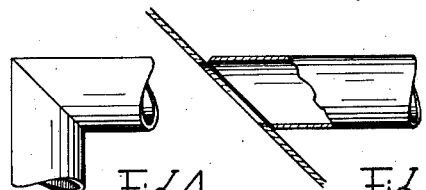
Fig.4.　　Fig.7.
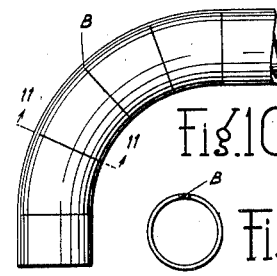
Fig.10.
Fig.11.
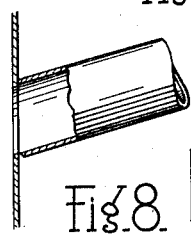
Fig.5.　　Fig.8.
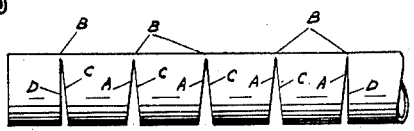
Fig.9.
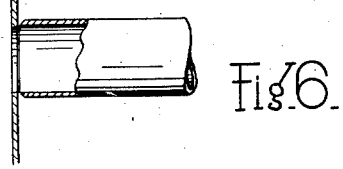
Fig.6.
INVENTOR.
DWIGHT GERBER
BY
ATTORNEY.

Patented May 9, 1933

1,907,955

UNITED STATES PATENT OFFICE

DWIGHT GERBER, OF PITTSBURGH, PENNSYLVANIA

CYLINDER AND PIPE CUTTING MACHINE

Application filed May 15, 1931. Serial No 537,672.

My invention relates to cylinder or pipe cutting machines and particularly to machines of this character adapted to cut and form the ends of pipe or cylinders for intersection with the ends of other pipes or cylinders of equal size and for intersection with plane surfaces at angles thereto. This machine is also adapted by virtue of its novel adjustments to enable the cutting of sections of pipe or cylinders in a manner to permit their being bent to form elbows or bends therein.

My invention is particularly useful for forming the ends of pipe and cylinders and other tubular instruments in the above manner and I do not wish to be limited to its use in connection with any particular element although for illustrative purposes it will be described as used in connection with the cutting and forming of pipe.

Pipe cutting machines of various types and character have been designed and used heretofore for this purpose but for the most part have proven generally unsatisfactory because of the time required for their use and the manual work and calculations necessary to properly execute work therewith. The primary object of my invention is to provide a composite machine which will, with a few simple settings, and adjustments, automatically describe the line of cut incident to the sizes of pipe involved and whether the intersection is to be at right angles or other than right angles. This eliminates the old method of mathematically plotting the desired intersection, making a template therefor, scribing the line on the pipe, fixing the scribed line with prick punches, etc. and finally following the line with a torch either manually or guiding by some pantograph mechanism.

Another and important object of my invention is to provide a machine of this character which on making the proper simple adjustments will rapidly, evenly, and automatically generate a correct delineation on the end of the pipe, cutting the same on said line.

A further object of my invention lies in the provision of means whereby upon making the proper adjustments the cut will result in an accurate single line intersection which affords ultimately a strong, rigid, and durable joint or intersection. This also insures a smooth joint for easy welding operations.

Another object of my invention is to provide a novel and mechanical means for moving and guiding the cutting torch completely circumferentially around the pipe and longitudinally thereof, in one continuous operation whereby a smooth even cut of the desired scarfing angle is insured on the proper line and with a minimum of effort and consequent use of gas provided for the cutting torch.

The machine of this invention is in many respects identical with that described in my copending application Serial No. 537,671, filed May 15, 1931 and therefore, lends itself to the use of various types of attachments by means of which line cuts of widely varying character may be made to meet different conditions of necessity in the welding of the ends of pipes to various surfaces. This invention differs from the one described in the above mentioned application in the type of adjusting mechanism used on the machine and by virtue of which straight angle cuts are made on the pipe ends whereby such ends may be welded in intersecting position with plane surfaces at the desired angle and with the ends of another pipe at the desired angle. Likewise, for making the proper cuts partially through the pipe section to permit its being bent to form a continuous curved section of pipe.

Other objects and advantages in details of construction and operation will be apparent as the description proceeds reference now being had to the figures of the accompanying drawings forming a part of this application and wherein like reference numerals indicate like parts.

In the drawings:

Figure 3 is a top plan view of the machine with the adjustment mechanism in a different position from that shown in Figure 1.

Figure 4 is a detail view illustrating the cuts which can be made on pipe ends for right angle intersection, namely, a miter joint.

Figure 5 is a detail view somewhat similar to Figure 4 showing the cuts made for pipe connections at an angle other than right angle.

Figure 6 is a detail view illustrating the type of cut made for right angular intersection of a pipe with a plane surface.

Figure 7 is a detail view illustrating the cut made for an angle intersection with a plane surface other than right angular.

Figure 8 is a view similar to Figure 7 illustrating a further cut and angular intersection.

Figure 9 is a detail view of a pipe section partially cut to form a bend.

Figure 10 is a detail view showing the pipe of Figure 9 after bending.

Figure 11 is a detail sectional view taken on the line 11—11 of Figure 10.

Figure 1:
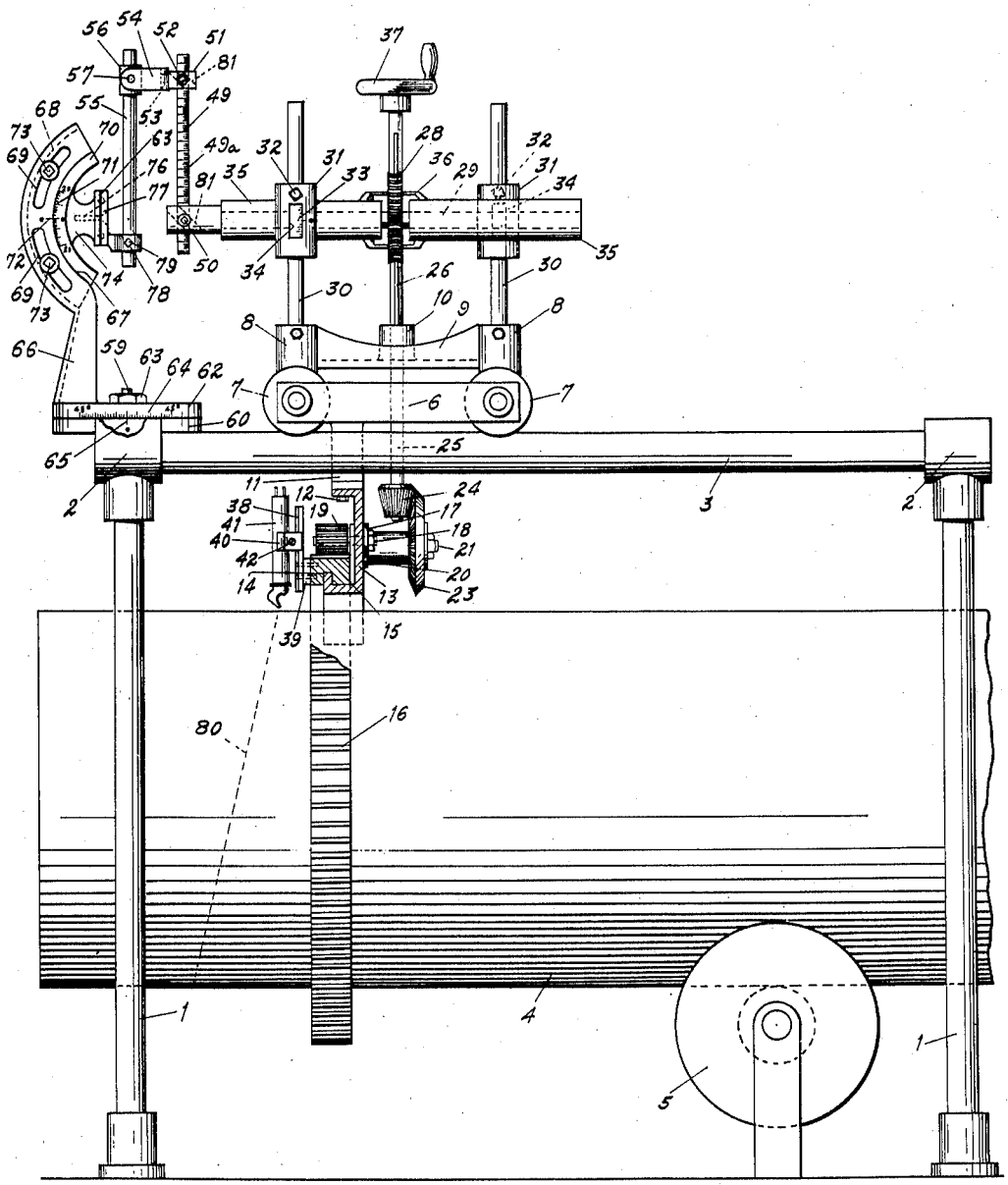
Figure 1 is a side elevation of my improved pipe cutting machine.

The reference character 1 indicates supporting posts forming a part of the supporting frame upon which my machine is mounted. These posts are shown as four in number and are connected at their upper ends at front and back by means of braces 2 and the front and rear posts are connected at their upper ends by tubular members 3 which provide trackways for a purpose to be described.

There is thus provided an open supporting frame into which and below the top thereof may be suitably supported the end of the pipe 4 to be cut. The supporting means for the pipe 4 may be of any desired construction and for purposes of illustration, beveled rollers 5 are provided for supporting the end of the pipe and permitting it to be easily adjusted longitudinally in the frame. These rollers 5 may be provided in different sizes or may be adjustably mounted whereby to compensate for varying sizes of pipe which may be placed in the machine for cutting. Mounted upon the trackways 3 for ready adjustment therealong is a carriage 6 supported upon the grooved wheels or rollers 7 riding upon the tracks 3. The carriage 6 is provided with a pair of upstanding sleeve bearings 8 connected by a preferably integral web 9 for strength. Also supported upon the carriage 6 and extending vertically therefrom is another sleeve bearing 10 for a purpose to be described.

Depending from the carriage 6 adjacent its front edge, is a downwardly extending supporting bracket 11, to the underside of which is secured as by bolts 12, a supporting hangar 13 preferably of channel cross section as shown in Figure 1 and the lower flanged edge of which engages within a groove 14 on the inner surface of a ring 15 through which the pipe 4 extends. The outer periphery of this ring 15 is toothed to provide the ring gear 16. This ring gear 16 may be provided by cutting the teeth on the ring itself or by securing thereon a separate toothed ring.

Centrally disposed on the supporting hangar 13 is a bearing 17 supporting a pin 18 upon which is mounted an idler gear 19 meshing with the teeth of the ring gear 16.

Also provided upon the supporting hanger 13 is a second bearing member 20 supporting a pin 21 upon which is mounted a pinion 22 meshing with the ring gear 16. The opposite end of the pin 21 extending rearwardly through the bearing 20, supports a beveled gear 23 meshing with a beveled gear 24 on the lower end of a vertically extending shaft 25 extending upwardly above the frame and through the sleeve bearing 10 on the carriage 6.

Slidably mounted upon the shaft 25, as by the key 26, and consequently rotatable with the shaft 25, is a worm 27. This worm 27 meshes with a worm gear 28 upon a horizontally disposed shaft 29 supported in the following manner.

Vertically supported within bearing supports 8 on the carriage 6 are two rods or posts 30. Slidably mounted upon these posts 30 for vertical adjustment are the sleeve bearings 31 provided with set screws 32 whereby the sleeves may be locked in any adjusted positions on the posts 30. The posts are graduated as at 33 for a purpose hereinafter described and the sleeves 31 are provided with openings or windows 34 through which the graduations on the posts are visible. Supported by the sleeve bearings 31 and preferably integral therewith are horizontally disposed and aligned sleeve bearings 35 supporting the shaft 29. These sleeve bearings 35 are connected adjacent their inner ends by means of an offset bracket 36 which also serves as a casing for the worm 27 slidable on said shaft. This is clearly shown in Figure 3.

The upper end of shaft 25 is provided with a hand wheel 37 by means of which the shaft may be rotated. From the description so far it will be apparent that upon rotation of the shaft 25, the horizontal shaft 29 will be rotated as will also the ring gear 16 through the beveled gears 24 and 23 and the pinion 22. It should be stated here that the cutting torch is adjustably mounted upon the ring 15 as by means of the bracket 38 secured to the ring as by means of the bolts 39. A spring clip 40 is provided on the bracket 38 and at its outer end holds the cutting torch 41. The clip 40 may be loosened with respect to the torch by means of the bolt 42 whereby the torch may be adjustably positioned in the clip both longitudinally and rotatively.

One end of the shaft 29 which is supported in the horizontal sleeves 35, carries at its end a rod 49 disposed at right angles thereto and preferably secured to the shaft 29 by means of a bolt 50. The opposite end of this rod 49 is secured to a lug 51 by means of the bolt 52 which lug is disposed at right angles to the rod 49. The rod 49 is suitably calibrated as at 49a for a purpose to be described. Rotatably swiveled to the free end of the lug 51 as at 53, is a U-shaped collar 54 extending on opposite sides of an axial beam 55 slidable upon which is a sleeve 56. The free ends of the collar 54 are provided with pins 57 which extend into and connect the collar with the sleeve 56. It will be clear from Figure 3, that the rod 49 may be adjusted longitudinally (transversely with respect to the end of the shaft 29) and also that the lug 51 carrying the collar 54 can be adjusted longitudinally of the rod 49 and consequently of the beam 55.

It will be clear from the description so far that rotation of the hand wheel 37 and shaft 25 will result in simultaneous rotation of the ring gear 16 carrying the cutting torch and the horizontally disposed shaft 29 to which the rod 49 is attached. It will also be clear that if no means is provided for moving the carriage 6 either forwardly or rearwardly on the trackways 3, the operation of the device as just described would result in the cutting torch describing a path completely around the pipe 4 parallel with the front of the supporting frame and consequently making a straight cut leaving the end of the pipe so cut at exactly right angles to the longitudinal center of the pipe. Such a cut is illustrated in Figure 6.

If it is desired, however, to make a cut on an angle with respect to the longitudinal section of the pipe, it will be necessary to move the carriage 6 and consequently the cutting torch 41 forwardly and rearwardly as it moves around the circumference of the pipe. In order that such cuts may be made at exactly the desired angles and such angles generated automatically by the operation of the machine, the following means is provided.

Figure 2:
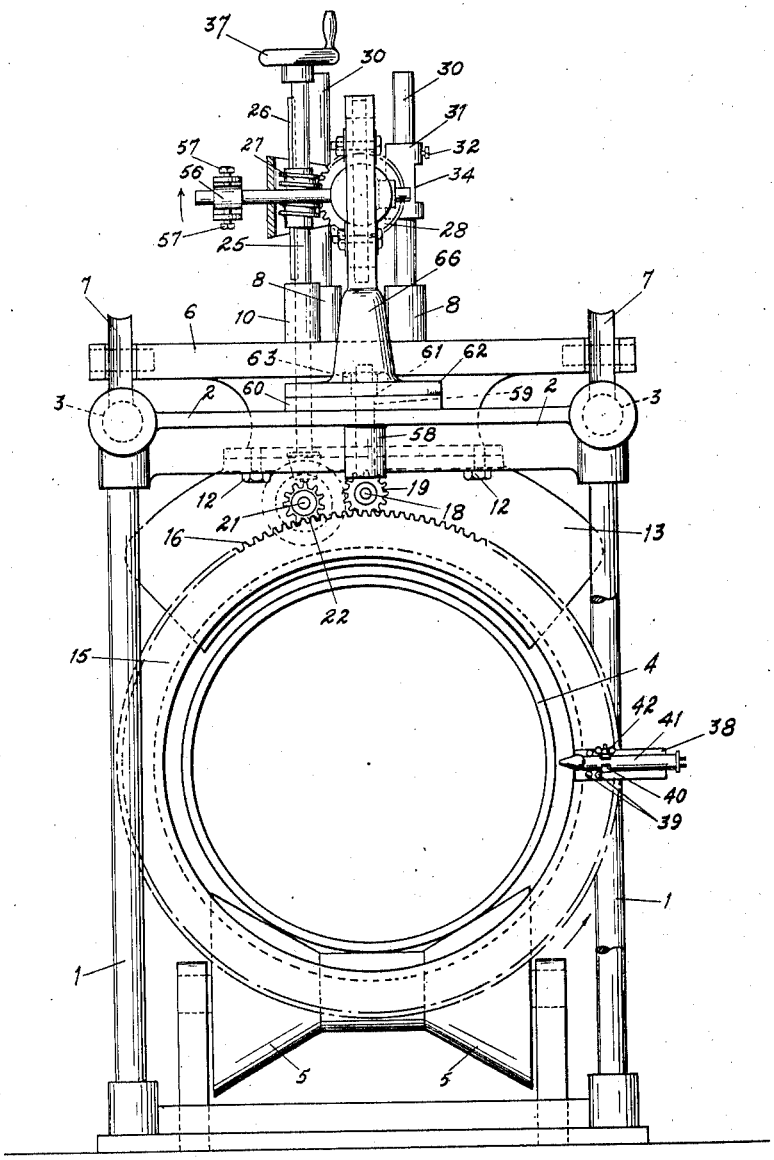
Figure 2 is a front elevation thereof.

Depending from the center of the front brace member 2 is a bearing 58 through which extends upwardly a pin 59. On the upper side of the front brace member 2 is a boss 60 having an upper smooth circular surface. The pin 59 is shouldered as at 61 and has its shoulder resting on the upper surface of the boss 60 as indicated clearly in Figure 2. This pin 59 extends upwardly for a short distance and provides a center pivot for a flat circular disk 62 rotatably journaled upon the upper boss 60. A nut 63 is threaded on the upper end of the pin 59 whereby to lock the disk 62 with respect to the boss 60. The outer edge of the disk 62 is calibrated as at 64 with respect to a zero point 65 on the boss 60 whereby the angle of adjustment of the disk 62 with respect to the frame of the machine may be accurately indicated.

Rigid with the disk 62 and positioned at one edge thereof, is an upstanding bracket arm 66, the upper end of which is arcuately formed as at 67 and channelled to a depth indicated by the dotted lines 68. The slides of this arcuate bracket member 67 are slotted as at 69, such slots communicating with the channel portion of the bracket. Slidably positioned within the channelled arcuate bracket is a correspondingly arcuately shaped sector 70 calibrated as at 71 with respect to a zero mark 72 on the bracket 67. This sector member 70 may be provided with openings in alignment with the slots 69 whereby locking bolts 73 may be passed therethrough to permit locking the sector member in any arcuately adjusted position and which when loosened permit ready adjustment thereof.

It may be noted here that with the sleeve bearings 31 adjusted vertically on the rods 30 to the zero position as indicated in Figure 1, and which is the normal operating position for the shaft 29, and the disk 62 adjusted to the zero position 65 and the sector member 70 adjusted to the zero position 72, such latter zero position will be in direct horizontal alignment or on center with the shaft 29.

The sector member 70 is provided with a forwardly extending boss 74 provided with front bearing surface 75, which may be in the form of a ball race, adapted to rotatably support as by the pin 76, a bracket 77 provided at one edge with an offset supporting lug 78 which receives one end of the beam 55 and which may be adjustably locked thereto by means of the set screw 79.

It will be clear, therefore, that with the beam 55 connected at one end to the bar 49 through the collar 54 and at the opposite end to the rotatable bracket 77, said beam will be rotatable about the center of rotation 76 with the bar 49 and shaft 29. It will also be understood that if the bar 49 is at right angles to the shaft 29, as shown in Figure 1, and said beam 55 is parallel to the bar 49, the rotation of said bar and beam will be in planes at exactly right angles to the longitudinal center of the shaft 29 and consequently of the pipe 4. As before stated the operation of the machine in such position of adjustment produces a square cut such as shown in Figure 6.

If it should be desired now to produce an angular cut of the character shown for instance in Figure 8, the bolts 73 are loosened and the sector member 70 slidably adjusted upwardly in its arcuate channel guide to the desired angle as indicated by the calibrations 71. This, of course, brings the rotary surfaces 75 and 77 and consequently the center of rotation of the beam 55 at an angle to the bar 49 and to the center of rotation of the shaft 29. In the position of adjustment just described the lower end of the beam 55 would assume in Figure 1 a position at a greater distance from the bar 49 and the upper end of the beam 55 would swing inwardly toward the pin 59 slightly. Such angular positioning of the beam 55 with respect to the bar 49 is, of course, permitted by virtue of the collar 54 being swivelled upon the slidable sleeve 56.

In such position and with the center of rotation of the beam 55 at such an angle to the bar 49, it is clear that upon rotation of the shaft 29 and bar 49, and by virtue of the connection between the bar 49 and the beam 55, said bar 49 and consequently the carriage 6 and cutting torch 41 would upon rotation of the beam 55 necessarily follow the forward and rearward movement of the beam 55 with respect to the longitude of the pipe 4. Consequently the cut made on the pipe would be on an angle extending forwardly from top to bottom, as indicated in dotted lines 80 and as indicated clearly in Figure 8. It is also obvious that if the adjustment of the sector member 70 was made in the opposite direction and the angle of the center of rotation of the beam 55 in the opposite direction from that just described, the angular cut made in the pipe would extend in the opposite direction to that just described.

Thus there is provided a means whereby cuts may be made on the end of a pipe at a predetermined angle to the longitudinal center thereof and extending forwardly and rearwardly thereof from top to bottom. It will be understood, of course, that when the disk 62 is kept at zero position as shown in Figure 1, such angular cuts as just described will be laterally at right angles with respect to the longitudinal center line of the pipe and the forward and rearward vertical cuts will be the same amount on each side of the longitudinal center line of the pipe.

If the angular cut to be made is desired in relation to the sides of the pipe, that is, from one side to the other instead of from top to bottom as just described, the bar 49 is removed and the disk 62 is adjusted rotatably to the desired angle of cut, which results in shifting the center of rotation of the beam 55 to a position offset relatively to the center of rotation of the shaft 29, such angular displacement being from one side to the other instead of above or below such center, as previously explained. A bar 49b having calibrations angularly disposed thereon and of a trifle greater length than the bar 49 is adjustably secured in angularly disposed openings 81 provided for this purpose in the end of the shaft 29 and in the lug 51 whereby to permit this lateral adjustment of the disk 62 as above described. The result of such adjustment will be to again position the beam 55 out of parallel with and at the desired angle to the bar 49b and consequently rotation of the beam 55 with the bar 49b will result in forward and rearward movement of the carriage 6 and forward and rearward movement of the cutting torch 41 during its rotation around the pipe, such forward and rearward movement of the torch 41 in this instance, however, being with respect to the sides of the pipe rather than with respect to the top and bottom of the pipe Such an adjustment is illustrated in Figure 3 and in which the parts are shown looking downwardly upon them from the top and with the initial or starting position of the bar 49b and beam 55 being shown as the horizontal position and with the cutting torch 41 likewise in a horizontal position or at one side of the pipe 4. The disk 62 has been adjusted to bring the center of rotation of the beam 55 at an angle of 45 degrees laterally with respect to the center of rotation of the bar 49b, namely the shaft 29. It should be noted that in the illustration just being described, the sector member 70 is set centrally or at zero in the bracket 67. It should also be observed at this point that with the sector member 70 at center position, and the disk 62 turned to an angle of 45 degrees, and the bar 49b also positioned at an angle being with respect to the longitude of the shaft 29, the bar 49b and beam 55 will be in parallel relation and will remain so during the rotation thereof. Obviously now, rotation of the shaft 29 and of the bar 49b and consequently the beam 55, will, because of the angular position of the center of rotation of the beam 55, move the carriage 6 rearwardly and forwardly as the torch 41 moves around the pipe, resulting in a straight angular cut of 45 degrees with respect to the center of the pipe from one side of the pipe to the other. Such a cut is shown in Figures 4 and 7 although in these figures the pipe has been turned to bring such cut from top to bottom instead of from one side to the other.

It may be desirable and necessary at times to make angular cuts on the ends of pipe, which cuts are at an angle to the longitudinal center thereof, both with respect to the top and bottom of the pipe and with respect to the sides of the pipe, in other words, a compound angle. The line of such a cut is as easily generated and the cutting performed as in the two illustrations just described, inasmuch as the adjustments may be made as before for the angles with respect to the top and bottom of the pipe and with respect to the sides of the pipe, in this instance, both adjustments being made. Assume for instance, that a cut on both the angles illustrated in Figures 7 and 8 is to be provided. The angle shown in Figure 7 to be ultimately used as shown, namely, with respect to the top and bottom of the pipe, and the cut shown in Figure 8 with respect to the sides of the pipe. Such a cut would permit the pipe to intersect a plane surface at an angle of 45 degrees thereto in one plane and at an angle of say 10 degrees thereto in another plane, that is sidewise.

For such a cut the disk 62 is adjusted to the position shown in Figure 3 with the bar 49b likewise adjusted as shown. The sector member 70 is then adjusted upwardly in the bracket 10 degrees and locked. Such adjustment will obviously displace the beam 55 angularly with respect to the bar 49b which will, of course, as before described, control the forward and rearward movement of the carriage and torch as respects the cut from top to bottom of the pipe. The disposition of the beam 55 by virtue of the adjustment of disk 62, will govern the forward and rearward movement of the carriage 6 and torch 41 thus governing the distance and angle of the cut from one side to the other of the pipe. Inasmuch as the center of rotation of the beam 55, which is at the point 76, governs the direction and amount of movement of the beam 55, and consequently the rearward and forward movement of the carriage and torch, it will be obvious that the path of travel of the torch represents the axial line generated by the beam which in turn is controlled by the angular disposition of the center of rotation thereof both with respect to the vertical angle of displacement from the shaft 29 by virtue of the sector 70, and the lateral angular displacement with respect to the shaft 29 by virtue of the disk 62. The resultant cut on the end of the pipe will, therefore, provide an angle cut of 45 degrees from one side of the pipe to the other and of 10 degrees from top to bottom. Thus such pipe end will intersect a plane surface at both these angles simultaneously.

Referring now to Figures 9 and 10 wherein is illustrated a piece of pipe or cylinder as cut by my machine to form a bend and assuming that the correct angles of the V-cuts to be made therein have been predetermined and the number of such cuts necessary to accomplish the desired bend have been suitably indicated at spaced points along the surface of the pipe or cylinder. The pipe is then mounted within the frame 1 on the beveled roller supports 5, in cutting relation with the torch and the operation of my invention is as follows:

The disk 62 is rotatably adjusted to zero position and securely locked in such position which results in direct right angle positioning of the rotary surfaces 75 and 77 and consequently the center of rotation of the beam 55 with respect to the end of the pipe or cylinder. The bar 49b is removed and the bar 49 replaced as previously described. The bolts 73 are loosened and the sector member 70 slidably adjusted upwardly in its arcuate channel guide to the correct predetermined angle of one side of the V-cuts indicated at A in Figure 9 and securely locked in such position. It is obvious from the foregoing that in such position as the hand wheel 57 is rotated the torch 41 will be rotated around the pipe and simultaneously be moved forwardly and rearwardly during such rotation to produce the desired angular cut. In making such a cut the torch is started from a point at the top of the cylinder and the completed cut terminates approximately twenty degrees from said starting point (see Figure 11) to thus provide a connecting rib as indicated at B for the formed bend. With the parts in the above described position all of the cuts marked "A" are made by advancing the pipe into proper cutting position with the torch to perform such operations. The sector member 70 is then similarly adjusted downwardly in its arcuate channel guide to the correct predetermined angle of the opposite side of the V-cuts indicated at C in Figure 9 and likewise locked in such position. The cutting operation is then performed in identically the same manner as above described, i. e., starting and terminating the cut so as to leave the twenty degree rib B and all of the cuts marked C are made with this adjustment thus completing a series of V-cuts at predetermined points along the pipe. It will be understood that the cuts D directly adjacent the ends of the pipe are straight right angle cuts made as previously described to accomplish the right angular bend herein shown when the pipe is so formed as illustrated in Figure 10.

It will be understood, of course, that during such cutting operations the torch 41 may be adjusted to any desired angle so as to impart the correct scarfing on the inner surfaces of such cuts necessary to facilitate the subsequent welding thereof.

Of course, many changes may be made in details of construction and operation without departing from the spirit and scope of my invention. I do not limit myself, therefore, to the exact form herein shown and described other than by the appended claims.

I claim:

1. A cutting apparatus for forming the ends of cylinders for intersecting connections comprising a cutting torch, a movable holder for said torch adapted to move said torch in cutting position circumferentially around a fixed cylinder, a carriage upon which said holder is mounted, said carriage and holder being movable longitudinally of said cylinder, and means including a rotatable beam connected with said carriage for moving said carriage and holder longitudinally of the cylinder simultaneously with the circumferential movement of the holder and to a predetermined extent whereby said torch cuts the cylinder on a required line.

2. A cutting apparatus for forming the ends of cylinders for intersecting connections comprising a cutting torch, a movable holder for said torch adapted to move said torch in cutting position circumferentially around a fixed cylinder, a carriage upon which said holder is mounted, said carriage and holder being movable longitudinally of said cylinder, means including a rotatable beam connected with said carriage for moving said carriage and holder longitudinally of the cylinder simultaneously with the circumferential movement of the holder and to a predetermined extent whereby said torch cuts the cylinder on a required line, and a single operating means for causing the movement of said carriage and holder.

3. A cutting apparatus for forming the ends of cylinders for intersecting connections comprising a cutting torch, a movable holder for said torch adapted to move said torch in cutting position circumferentially around a fixed cylinder, a carriage upon which said holder is mounted, said carriage and holder being movable longitudinally of said cylinder, means including a rotatable beam connected with said carriage for moving said carriage and holder longitudinally of the cylinder simultaneously with the circumferential movement of the holder and to a predetermined extent whereby said torch cuts the cylinder on a required line, and means for adjusting the lateral position of said beam with respect to said carriage whereby the movement of said carriage is modified to generate a line of cut angular horizontally with respect to the longitudinal axis of said cylinder.

4. A cutting apparatus for forming the ends of cylinders for intersecting connections comprising a cutting torch, a movable holder for said torch adapted to move said torch in cutting position circumferentially around a fixed cylinder, a carriage upon which said holder is mounted, said carriage and holder being movable longitudinally of said cylinder, means including a rotatable beam connected with said carriage for moving said carriage and holder longitudinally of the cylinder simultaneously with the circumferential movement of the holder and to a predetermined extent whereby said torch cuts the cylinder on a required line, and means for adjusting the vertical position of said beam with respect to said carriage whereby the movement of said carriage is modified to generate a line of cut angular vertically with respect to the longitudinal axis of said cylinder.

5. A cutting apparatus for forming the ends of cylinders for intersecting connections comprising a cutting torch, a movable holder for said torch adapted to move said torch in cutting position circumferentially around a fixed cylinder, a carriage upon which said holder is mounted, said carriage and holder being movable longitudinally of said cylinder, means including a rotatable beam connected with said carriage for moving said carriage and holder longitudinally of the cylinder simultaneously with the circumferential movement of the holder and to a predetermined extent whereby said torch cuts the cylinder on a required line, and means for adjusting the lateral and vertical position of said beam with respect to said carriage whereby the movement of said carriage is modified to generate simultaneously a line of cut angular horizontally and vertically with respect to the longitudinal axis of said cylinder.

6. A cutting apparatus for forming the ends of cylinders for intersecting connections comprising a frame, a carriage slidable on said frame longitudinally of a cylinder held in fixed relation to said frame, a torch holder mounted on said carriage for movement therewith and for independent circumferential movement around the cylinder, a torch on said holder and adjustable to selective cutting position with respect to said cylinder, a rotatable beam on said frame, and adjustable connections between said beam and said carriage whereby the longitudinal movement of said carriage is governed by said beam to generate a required line of cut on the cylinder upon the simultaneous movement of said carriage and holder.

7. A cutting apparatus for forming the ends of cylinders for intersecting connections comprising a frame, a carriage slidable on said frame longitudinally of a cylinder held in fixed relation to said frame, a torch holder mounted on said carriage for movement therewith and for independent circumferential movement around the cylinder, a torch on said holder and adjustable to selective cutting position with respect to said cylinder, a rotatable beam on said frame, adjustable connections between said beam and said carriage whereby the longitudinal movement of said carriage is governed by said beam to generate a required line of cut on the cylinder upon the simultaneous movement of said carriage and holder, and a single operating means for simultaneously moving said carriage and said holder.

8. A cutting apparatus for forming the ends of cylinders for intersecting connections comprising a frame, a carriage slidable on said frame longitudinally of a cylinder held in fixed relation to said frame, a torch holder mounted on said carriage for movement therewith and for independent circumferential movement around the cylinder, a torch on said holder and adjustable to selective cutting position with respect to said cylinder, a rotatable beam on said frame, adjustable connections between said beam and said carriage whereby the longitudinal movement of said carriage is governed by said beam to generate a required line of cut on the cylinder upon the simultaneous movement of said carriage and holder, a turntable on said frame carrying said beam, and means for adjusting said turntable to selectively position said beam laterally with respect to said carriage whereby the movement of said carriage is modified to generate a line of cut angular with respect to the longitudinal axis of said cylinder.

9. A cutting apparatus for forming the ends of cylinders for intersecting connections comprising a frame, a carriage slidable on said frame longitudinally of a cylinder held in fixed relation to said frame, a torch holder mounted on said carriage for movement therewith and for independent circumferential movement around the cylinder, a torch on said holder and adjustable to selective cutting position with respect to said cylinder, a rotatable beam on said frame, adjustable connections between said beam and said carriage whereby the longitudinal movement of said carriage is governed by said beam to generate a required line of cut on the cylinder upon the simultaneous movement of said carriage and holder, a turntable on said frame having a quadrant carrying said beam, and a means for adjusting said quadrant to selectively position said beam angularly vertically with respect to said carriage whereby the movement of said carriage is modified to generate a line of cut angular with respect to the longitudinal axis of said cylinder.

In testimony whereof, I affix my signature.

DWIGHT GERBER.